US012045586B2

(12) United States Patent
Vinod

(10) Patent No.: US 12,045,586 B2
(45) Date of Patent: Jul. 23, 2024

(54) METHODS AND SYSTEMS FOR IMPLEMENTING A PAPER FORM TO A WEB APPLICATION CONSTRUCTION USING A DIGITAL CAMERA VISUALIZATION

(71) Applicant: Babu Vinod, Fremont, CA (US)

(72) Inventor: Babu Vinod, Fremont, CA (US)

( * ) Notice: Subject to any disclaimer, the term of this patent is extended or adjusted under 35 U.S.C. 154(b) by 129 days.

(21) Appl. No.: 17/943,162

(22) Filed: Sep. 12, 2022

(65) Prior Publication Data

US 2023/0176833 A1 Jun. 8, 2023

Related U.S. Application Data

(60) Provisional application No. 63/243,172, filed on Sep. 12, 2021.

(51) Int. Cl.

*G06F 8/34* (2018.01)
*G06F 8/38* (2018.01)
*G06F 8/60* (2018.01)

(52) U.S. Cl.

CPC .................. *G06F 8/34* (2013.01); *G06F 8/38* (2013.01); *G06F 8/60* (2013.01)

(58) Field of Classification Search

None

See application file for complete search history.

(56) References Cited

U.S. PATENT DOCUMENTS

| | | | | |
|---|---|---|---|---|
| 2007/0195370 A1* | 8/2007 | Suga | G06F 40/174 | 358/1.18 |
| 2010/0278453 A1* | 11/2010 | King | G06F 40/197 | 715/230 |
| 2012/0314954 A1* | 12/2012 | Moore | H04N 1/32144 | 235/375 |
| 2015/0193735 A1* | 7/2015 | Lavrov | G06Q 10/10 | 705/342 |
| 2017/0109142 A1* | 4/2017 | Kaushal | H04W 4/50 | |
| 2019/0065614 A1* | 2/2019 | Bilsten | G06Q 10/10 | |

* cited by examiner

*Primary Examiner* — Qing Chen

(57) ABSTRACT

In one aspect, computerized method for paper form to a web application construction using a digital camera visualization comprising: obtaining the digital camera visualization comprising a set of digital snapshots of one or more paper forms of a web application workflow; submitting the set of digital snapshots to a cloud-platform based web-application builder system; in the cloud-platform based web-application builder system, extracting a field and a layout information from the one or more paper forms; in an application builder service: inspecting intermediate representation; using the field and a layout information to generate a user-interface screen, a database schema, and an intermediate business logic code of the constructed web application; packaging the user-interface screen, the database schema, and the intermediate business logic code of the constructed web application along with a configuration information to a deployment service; and in the deployment service: building the container that contains the services and data base instance of the constructed web application.

9 Claims, 3 Drawing Sheets

SNAP SHOTS OF PAPER FORMS (E.G. WORKFLOWS, NOTES, ETC.) 116
APPLICATION DEVELOPMENT SERVICE 120
COMPUTER NETWORK(S) & CLOUD COMPUTING PLATFORM(S) 118
CRUD OPERATIONS 110
APPLICATION DEVELOPMENT ENGINE 102
DOMAIN KNOWLEDGE 112
MACHINE LEARNING ENGINE 104
ML MODELS 114
COMPUTER VISION ENGINE 106
API 108
100

METHODS AND SYSTEMS FOR IMPLEMENTING A PAPER FORM TO A WEB APPLICATION CONSTRUCTION USING A DIGITAL CAMERA VISUALIZATION

CLAIM OF PRIORITY

This application claims priority to U.S. Provisional Patent application No. 63/243,172, titled METHODS AND SYSTEMS FOR PAPER FORM TO WEB APPLICATION CONSTRUCTION VIA DIGITAL CAMERA VISUALIZATION, and filed on 12 Sep. 2021. This provisional application is hereby incorporated by reference in its entirety.

SUMMARY OF INVENTION

In one aspect, computerized method for paper form to a web application construction using a digital camera visualization comprising: obtaining the digital camera visualization comprising a set of digital snapshots of one or more paper forms of a web application workflow; submitting the set of digital snapshots to a cloud-platform based web-application builder system; in the cloud-platform based web-application builder system, extracting a field and a layout information from the one or more paper forms; in an application builder service: inspecting intermediate representation; using the field and a layout information to generate a user-interface screen, a database schema, and an intermediate business logic code of the constructed web application; packaging the user-interface screen, the database schema, and the intermediate business logic code of the constructed web application along with a configuration information to a deployment service; and in the deployment service: building the container that contains the services and data base instance of the constructed web application.

BACKGROUND

Data entry and data editing forms occur commonly in business applications. In certain applications the predominant user interface appears as forms. When digitizing existing business processes (e.g. KYC or opening a bank account) there may exists a data entry form in printed paper. The user can be asked to manually fill it in, which is then verified and processed. In order to automate the digitization of these business processes it is beneficial to use the existing paper form(s) as a starting point in the application construction.

Figure 1:
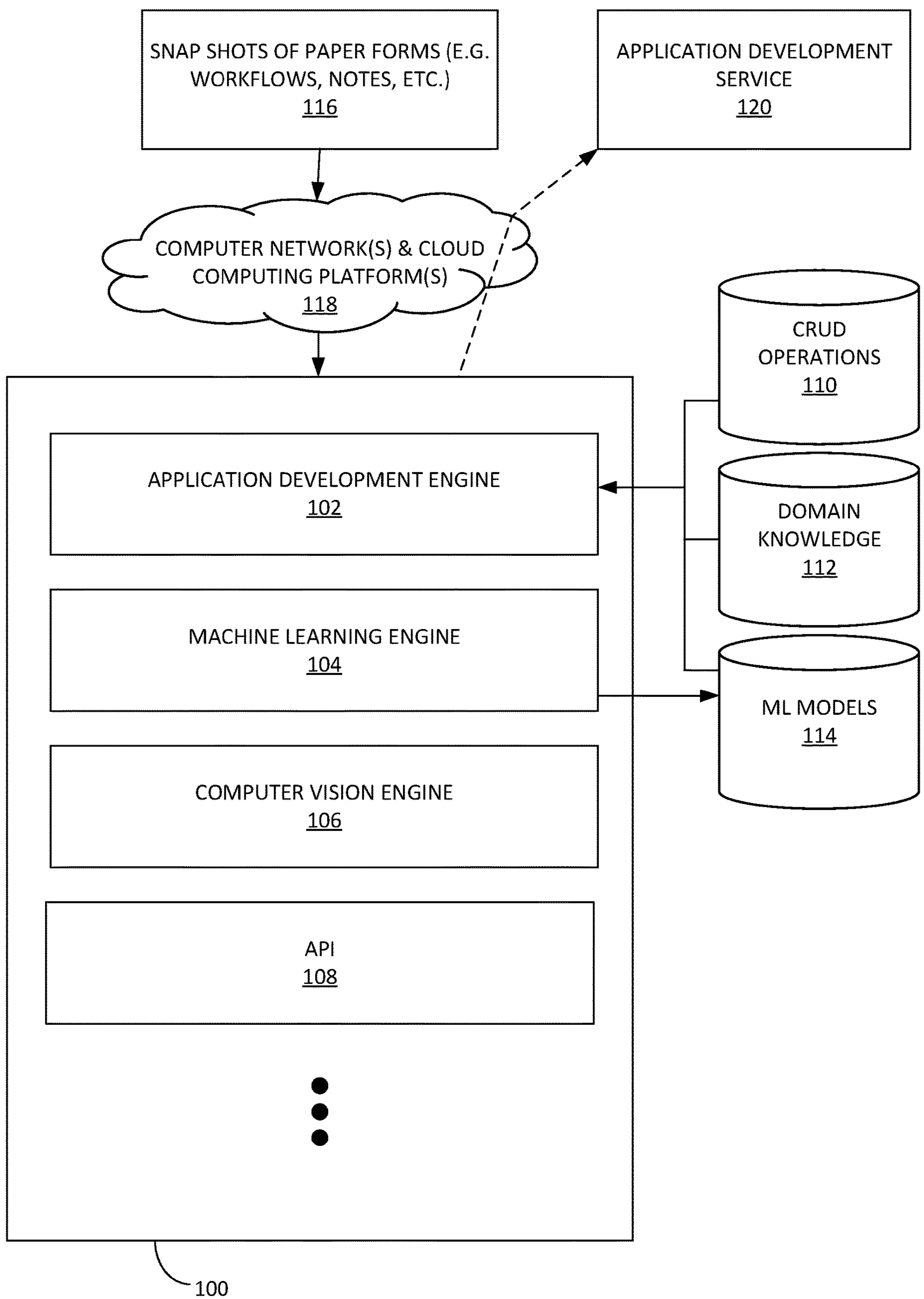
FIG. 1 illustrates an example system used to implement a paper form to web application construction via digital camera visualization, according to some embodiments.

The Figures described above are a representative set and are not an exhaustive with respect to embodying the invention.

DESCRIPTION

Disclosed are a system, method, and article of manufacture for paper form to web application construction via digital camera visualization. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Create, read, update, and delete (CRUD) are the four basic operations of persistent storage. CRUD is also sometimes used to describe user interface conventions that facilitate viewing, searching, and changing information using computer-based forms and reports.

JSON (JavaScript Object Notation) is an open standard file format and data interchange format that uses human-readable text to store and transmit data objects consisting of attribute—value pairs and arrays (e.g. and/or other serializable values). It is a common data format with diverse uses in electronic data interchange, including that of web applications with servers.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, logistic regression, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised. ML can be used to optimize and/or other improve analysis for the systems and methods provided herein.

Optical character recognition or optical character reader (OCR) is the electronic or mechanical conversion of images of typed, handwritten, or printed text into machine-encoded text, whether from a scanned document, a photo of a document, a scene-photo (e.g. the text on signs and billboards in a landscape photo) and/or from subtitle text superimposed on an image.

Transformer is a deep learning model that adopts the mechanism of attention, differentially weighing the significance of each part of the input data. It is used primarily in the field of natural language processing (NLP) and in computer vision (CV).

Web application is application software that runs on a web server, unlike computer-based software programs that are run locally on the operating system (OS) of the device. Web applications can be accessed by the user through a web browser with an active network connection. These applications can be programmed using a client—server modeled structure—the user (e.g. client) is provided services through an off-site server that is hosted by a third-party.

Example Systems and Methods

In one example, an application running in the smartphone camera enables users to take snapshots of one or more paper forms and then transmit them to a cloud service. The cloud service performs image processing and deep learning techniques on the captured snapshots to identify field names and field layout of the form. The field names and field layout are extracted and represented in an intermediate format such as JSON and then forwarded to an application builder service. The builder service uses the provided field information along with domain knowledge and machine learning models to automatically build application screens corresponding to these forms as well as the database schema and the basic CRUD (create/read/update/delete) operations in the business logic layer. Domain knowledge may also be employed to create services for other business logics that are suitable for the domain. The constructed application is packaged together along with the generated code, DB schema and configuration files are given to a deployment service. The deployment services creates a container with DB instances, application service instances, and web services. Additionally, a provisioning service instantiates the containerized services based on runtime and load requirements.

FIG. 1 illustrates an example system 100 used to implement a paper form to web application construction via digital camera visualization, according to some embodiments. System 100 enables a user to automate whole or part of application construction by taking a snapshot of the paper form(s) from a smartphone camera.

System 100 can include application builder module 102. Application builder module 102 can be used to program/construction web applications. Application builder module 102 can receive snapshots of one or more paper forms with web application development content (e.g. via computer networks and/or cloud-computing platforms 118, etc.). Application builder module 102 can be implemented in a cloud-computing platform. For example, application builder module 102 can receive digital image snapshots 116 from a web-development application operative in a mobile device that took the snapshots 116. The mobile device can transmit the snap shots to a cloud-based service of application builder module 102. The cloud-based service performs image processing and deep learning techniques on the captured snapshots 116 to identify field names and field layout of the form.

Application builder module 102 can use the provided field information along with domain knowledge and machine learning models 114 (e.g. developed by ML engine 104, etc.) to automatically build application screens corresponding to these forms as well as the database schema and the basic CRUD (create/read/update/delete) operations 110 in the business logic layer. Domain knowledge 112 may also be employed to create services for other business logics that are suitable for the domain. The constructed application is packaged together along with the generated code, DB schema and configuration files are given to a deployment service 118.

The paper form can include drawn/written out workflows, diagrams, session notes, etc. Application builder module 102 can aggregate snapshots 116 in a workflow-like manner. Alternatively, a brief workflow diagram can be generated from the snapshots 116.

System 100 can include ML engine 104. ML engine 104 can use various ML methods to generate models that can optimize and/or automate web application programming. In one example, ML engine 104 for automatically generating various aspects of the web application program. API 108 can be used by a third-party and/or outside web development application to access the services of system 100.

Computer vision engine 106 can use various computer vision functionalities (e.g. OCR, etc.) to convert the content of the digital image snapshots 116 to a computer-readable medium. Computer vision engine 106 can also perform image processing and rendering operations. Computer vision engine 106 can object recognition systems, object identification systems, objection detection systems, OCR systems, etc.

System 100 can be used as a standalone service (e.g. a web service) and/or as part of a larger code application development platform and/or on a mobile-device application.

Figure 2:
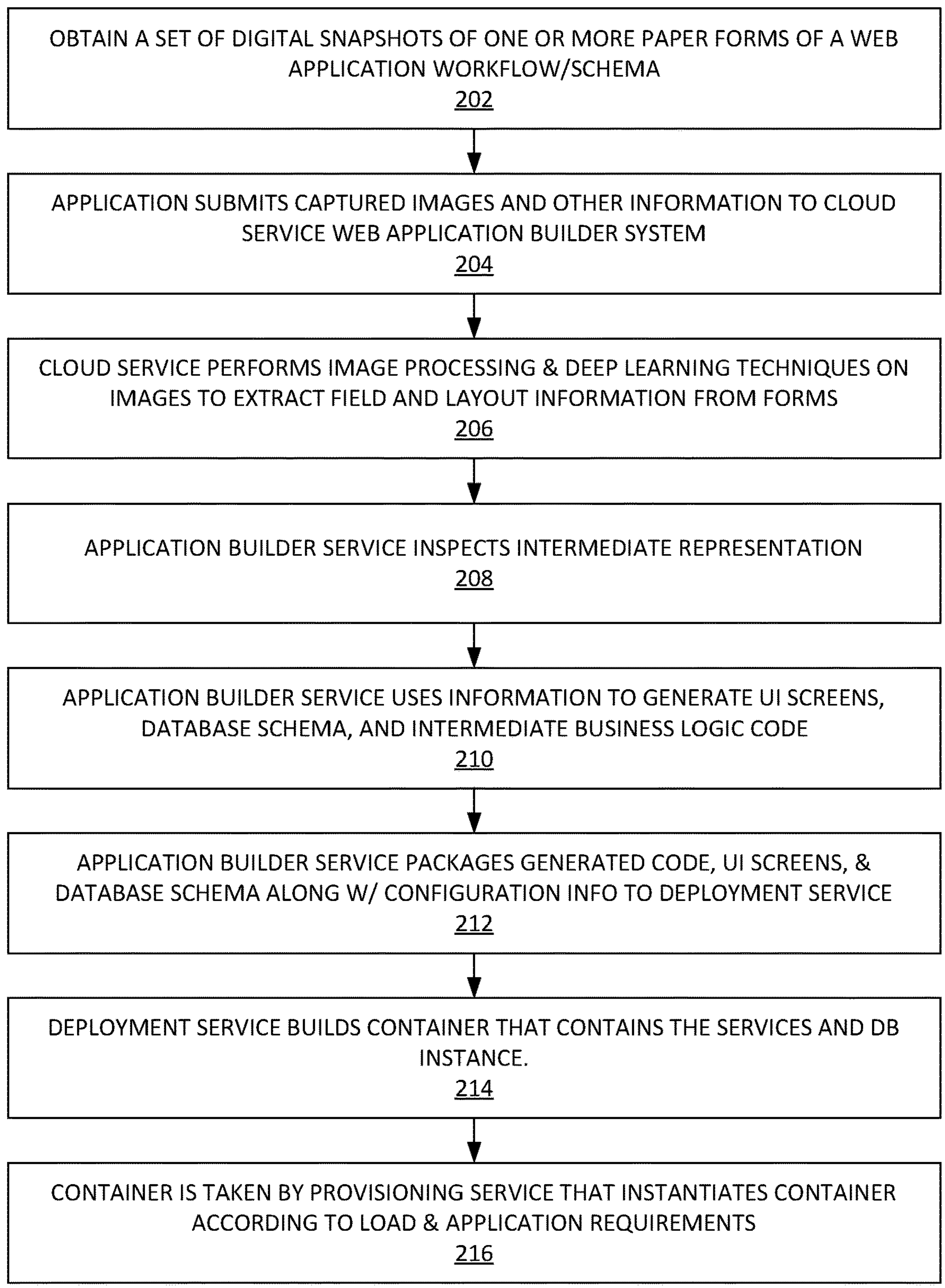
FIG. 2 illustrates an example process for implementing a paper form to web application construction via digital camera visualization, according to some embodiments.

FIG. 2 illustrates an example process 200 for implementing a paper form to web application construction via digital camera visualization, according to some embodiments. Process 200 can be implemented by system 100. In step 202, process 200 obtains a set of digital snapshots of one or more paper forms of a web application workflow/schema. A smartphone or a tablet-based application enables users to take snapshots of paper forms. The snapshots are aggregated by the mobile-device side application. The application may allow the user to order the forms if there are multiple forms. In addition, the application may allow the user to visually organize the forms in a workflow-like manner. Alternatively a brief workflow diagram may be drawn by the user and captured by the application.

The application then submits the captured images along with their ordering information (e.g. a graph-like partial ordering) along with additional workflow information to a cloud service web application builder system in step 204. In step 206, the cloud service performs image processing and deep learning techniques on the images to extract field and layout information from the forms. The extracted information is represented in an intermediate format (e.g., JSON) and submitted to an application builder service of the web application builder system.

In step 208, the application builder service inspects the intermediate representation consisting of the extracted field and layout information from forms, their ordering and any additional workflow information. In step 210, the application builder service uses this information to generate UI screens, database schema, and the intermediate business logic code (including field validation). Standard modules such as authentication and authorization may be added by the builder to the application code.

In step 212, the application builder service packages the generated code, UI screens, and database schema along with any generated configuration information to the deployment service. In step 214, the deployment service builds a container that contains all the services and the DB instance. In step 216, the container is then taken by a provisioning service that instantiates the container according to load and application requirements.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset.

Additional Example Computer Architecture and Systems

Figure 3:
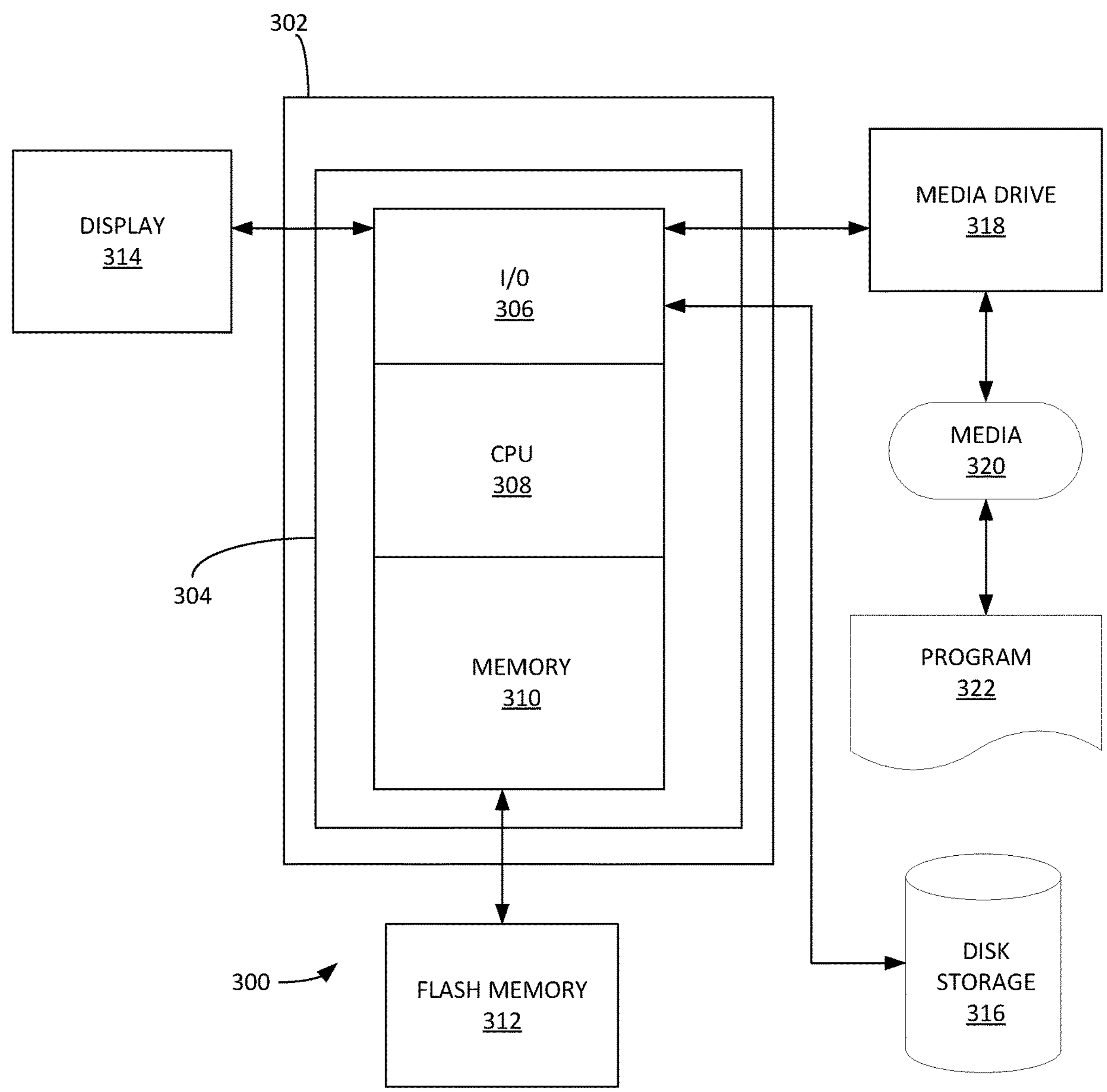
FIG. 3 is a block diagram of a sample computing environment that can be utilized to implement various embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for implementing a paper form to a web application construction using a digital camera visualization comprising:

obtaining the digital camera visualization comprising a set of digital image snapshots of one or more paper forms of a web application workflow;

submitting the set of digital image snapshots of the one or more paper forms of the web application workflow to a cloud-platform based web-application builder system;

in the cloud-platform based web-application builder system;

extracting a field and a layout information from the one or more paper forms of the web application workflow;

submitting an intermediate format representation of the extracted field and layout information to an application builder service;

in the application builder service:

inspecting the intermediate format representation of the extracted field and layout information;

using the extracted field and layout information to generate a user-interface screen, a database schema, and an intermediate business logic code of the constructed web application;

packaging the user-interface screen, the database schema, and the intermediate business logic code of the constructed web application along with a configuration information to a deployment service; and in the deployment service:

building a container that contains services and a database instance of the constructed web application.

2. The computerized method of claim 1, wherein a specified deep-learning technique is performed on the set of digital image snapshots of the one or more paper forms of the web application workflow during extraction of the field and the layout information from the one or more paper forms of the web application workflow.

3. The computerized method of claim 2, wherein the container is taken by provisioning a service that instantiates the container according to load and application requirements.

4. The computerized method of claim 3, wherein a smartphone includes a mobile-device side application that enables a user to take the set of digital image snapshots of the one or more paper forms of the web application workflow.

5. The computerized method of claim 4, wherein the set of digital image snapshots of the one or more paper forms of the web application workflow are aggregated by the mobile-device side application.

6. The computerized method of claim 5, wherein the mobile-device side application enables the user to order the digital image snapshots of the one or more paper forms of the web application workflow.

7. The computerized method of claim 6, wherein the mobile-device side application enables the user to visually organize the digital image snapshots of the one or more paper forms of the web application workflow in a workflow-like manner.

8. The computerized method of claim 7, wherein the intermediate format representation of the extracted field and layout information is a JSON (JavaScript Object Notation) format.

9. A computerized system for implementing a paper form to a web application construction using a digital camera visualization comprising:

a processor; and a memory containing instructions when executed on the processor, causes the processor to perform operations that:

obtain the digital camera visualization comprising a set of digital image snapshots of one or more paper forms of a web application workflow;

submit the set of digital image snapshots of the one or more paper forms of the web application workflow to a cloud-platform based web-application builder system;

in the cloud-platform based web-application builder system;

extract a field and a layout information from the one or more paper forms of the web application workflow;

submit an intermediate format representation of the extracted field and layout information to an application builder service;

in the application builder service:

inspect the intermediate format representation of the extracted field and layout information;

use the extracted field and layout information to generate a user-interface screen, a database schema, and an intermediate business logic code of the constructed web application;

package the user-interface screen, the database schema, and the intermediate business logic code of the constructed web application along with a configuration information to a deployment service; and in the deployment service:

build a container that contains services and a database instance of the constructed web application.

* * * * *